United States Patent [19]

Liu

[11] Patent Number: 4,539,358

[45] Date of Patent: Sep. 3, 1985

[54] POLYCARBONATE COMPOSITIONS

[75] Inventor: Ping Y. Liu, Naperville, Ill.

[73] Assignee: General Electric Company, Mt. Vernon, Ind.

[21] Appl. No.: 515,488

[22] Filed: Jul. 20, 1983

Related U.S. Application Data

[63] Continuation of Ser. No. 132,331, Mar. 20, 1980, abandoned.

[51] Int. Cl.$^3$ .................. C08L 73/00; C08K 5/09; C08K 5/12
[52] U.S. Cl. .................... 524/285; 428/412; 524/296; 524/297; 524/321; 524/508; 525/148
[58] Field of Search .............. 525/148; 428/412; 524/508, 285, 296, 297, 321

[56] References Cited

U.S. PATENT DOCUMENTS

| | | | |
|---|---|---|---|
| 3,520,768 | 7/1970 | Peilstocker et al. | 428/412 |
| 3,957,921 | 5/1976 | Iwahashi et al. | 525/148 |
| 4,082,715 | 4/1978 | Mercier | 524/295 |
| 4,107,386 | 8/1978 | Gruber et al. | 428/412 |
| 4,148,842 | 4/1979 | Yu et al. | 525/148 |
| 4,201,828 | 5/1980 | Triebel et al. | 428/412 |
| 4,226,950 | 10/1980 | Holub et al. | 525/148 |
| 4,251,647 | 2/1981 | Liu | 525/91 |
| 4,255,534 | 3/1981 | Liu | 525/91 |
| 4,257,937 | 3/1981 | Cohen et al. | 524/445 |
| 4,260,693 | 4/1981 | Liu | 525/148 |
| 4,263,415 | 4/1981 | Liu | 525/148 |
| 4,263,416 | 4/1981 | Liu et al. | 525/148 |

FOREIGN PATENT DOCUMENTS

| | | | |
|---|---|---|---|
| 43-13384 | 6/1968 | Japan | 525/148 |
| 18611 | 8/1968 | Japan . | |

OTHER PUBLICATIONS

Derwent Abstract 42791 V/23 (J74018779) 5-1974, Mitsubishi Rayon.
Derwent Abstract 42792 V/23 (J74018780) 5-1974, Mitsubishi Rayon.
Derwent Abstract 59125 W/36 (DT2507411) 8-1975, Montsanto.
Derwent Abstract 10041 W/06 (J75000750) 1-1975, Mitsubishi Rayon.

*Primary Examiner*—Herbert J. Lilling
*Attorney, Agent, or Firm*—Martin B. Barancik

[57] ABSTRACT

Ternary compositions are disclosed which comprise a mixture of a high molecular weight thermoplastic, aromatic polycarbonate, an acrylate copolymer, and an organic, ester-type plasticizer.

12 Claims, No Drawings

POLYCARBONATE COMPOSITIONS

This is a continuation, of copending application Ser. No. 132,331, filed 3/20/80, now abandoned.

DESCRIPTION

The present invention is directed to high molecular weight, aromatic polycarbonate compositions having improved aged impact strength and improved low temperature impact strength.

BACKGROUND OF THE INVENTION

It is well known that high molecular weight, aromatic polycarbonate resins have high impact strength below a critical thickness of between about ½ and ¼ inches. Above this average thickness, the impact strength of such polycarbonate resins is low. It is also known that the impact strength of these polycarbonate resins decreases rapidly as temperatures decrease below about −5° C. as well as after aging at elevated temperatures above about 100° C. These characteristics limit the fields of applications of these resins. Thus, unmodified polycarbonates are not practical for use at low or high temperatures, particularly when good impact strength is required. Therefore, it is desirable to improve the impact strength of polycarbonate resins at bogh low and high temperatures as well as improve their aged impact strength and thereby expand the fields of application of such resins.

Polycarbonate compositions having improved impact strength at both high and low temperatures as well as improved aged impact strength are disclosed in co-pending applications Ser. Nos. 69,822; 69,823; 69,824; and 69,825 all of which were filed Aug. 27, 1979 and are now respectively U.S. Pat. Nos. 4,263,415; 4,260,693; 4,263,416; and 4,245,058. as well as in co-pending application Ser. Nos. 132,330; 132,325; 4,132,190 filed of even date with this application and are now respectively U.S. Pat. Nos. 4,320,212; 4,251,674; and 4,255,534.

DESCRIPTION OF THE INVENTION

It has now been found that additional ternary compositions comprising a high molecular weight, thermoplastic, aromatic polycarbonate, an acrylate copolymer, and an organic, ester-type plasticizer also exhibit improved aged impact strength and that certain formulations thereof exhibit improved impact strength at both low and high temperatures as compared to unmodified polycarbonate resins.

The high molecular weight, thermoplastic, aromatic polycarbonates which can be employed in the present invention are those homopolycarbonates and copolycarbonates and mixtures thereof which have average molecular weights of about 8,000 to more than 200,000, preferably about 20,000 to 80,000, and an intrinsic viscosity (I.V.) of about 0.40 to 1.0 deciliters/grams (dl/g) as measured in methylene chloride at 25° C. These polycarbonates are typically derived from dihydric phenols such as, for example, 2,2-bis(4-hydroxyphenyl)propane (also referred to as bisphenol-A; i.e., BPA), bis(4-hydroxyphenyl)methane, 2,2-bis(4-hydroxy-3-methylphenyl)propane, 4,4-bis(4-hydroxyphenyl)heptane, 2,2-(3,5,3′,5′-tetrachloro-4,4′-dihydroxyphenyl)propane, 2,2-(3,5,3′,5′-tetrabromo-4,4′-dihydroxydiphenyl)propane, and (3,3′-dichloro-4,4′-dihydroxydiphenyl)methane. Other dihydric phenols which are suitable for use in preparing these polycarbonates are disclosed in U.S. Pat. Nos. 2,999,835; 3,028,365; 3,334,154; and 4,131,575.

The aromatic polycarbonates of the invention can be manufactured by known processes such as, for example, the interfacial polymerization techniques wherein a dihydric phenol is reacted with a carbonate precursor, such as phosgene, in the presence of a suitable organic medium, such as methylene chloride. These processes are disclosed in the above identified U.S. Pats as well as in U.S. Pat. Nos. 4,018,750 and 4,123,436. Transesterification processes can also be employed to prepare these resins such as are disclosed in U.S. Pat. No. 3,153,008, as well as other processes known to those skilled in the art.

The aromatic polycarbonates of the invention can also include the polymeric derivatives of a dihydric phenol, a dicarboxylic acid, and carbonic acid, such as are disclosed in U.S. Pat. No. 3,169,131.

It is also possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in preparing the aromatic polycarbonate to be employed in the invention. In addition, blends of any of the above materials can be used to provide the aromatic polycarbonate.

Further, branched polycarbonates, such as are disclosed in U.S. Pat. No. 4,001,184 can also be employed as can blends of a linear polycarbonate and a branched polycarbonate to provide the aromatic polycarbonate of the invention.

The "acrylate" copolymer employed in the invention is a copolymer of a $C_1$–$C_5$ methacrylate and a $C_1$–$C_5$ acrylate, wherein the "$C_1$–$C_5$" represents both saturated and unsaturated, straight or branched chained aliphatic hydrocarbon radicals having from 1 to 5 carbon atoms and which can be employed in amounts of about 2–4 parts by weight per hundred parts of aromatic polycarbonate.

Preferred acrylates for use in the acrylate copolymer are methyl acrylate, ethyl acrylate, isobutyl acrylate, 1,4-butanediol diacrylate, n-butyl acrylate, and 1,3-butylene diacrylate. Preferred methacrylates for use in this copolymer include methyl methacrylate, isobutyl methacrylate, 1,3-butylene dimethacrylate, butyl methacrylate and ethyl methacrylate.

Based on the total weight of the copolymer, the acrylate portion thereof can range from about 50–85 weight percent and the methacrylate portion thereof can range from about 15–40 weight percent.

The preferred acrylate copolymer for use in this invention is a copolymer of n-butyl acrylate and methyl methacrylate wherein the weight ratio of n-butyl acrylate:methyl methacrylate is about 3:2.

Suitable acrylate copolymers can be prepared by methods well known to those skilled in the art or can be obtained commercially. For example, Rohm and Haas' Acryloid ® KM 330 copolymer, which is a copolymer of n-butyl acrylate and methyl methacrylate, is suitable for use in the present invention.

The organic, ester-type plasticizers which can be employed in the invention are azelate esters, adipate esters and phthalate esters, all of which are commercially available. The azelate esters include such compounds as di-n-hexyl azelate and di-(2-ethylhexyl)azelate. Di-cyclohexyl phthalate and di(2-ethyl hexyl) adipate illustrate the type of phthalate ester and adipate ester compounds which can be used. For low temperature applications, di-n-hexyl azelate is preferred.

The amount of organic, ester-type plasticizer which can be employed in the ternary compositions of the invention can range from about 0.4–2.0 parts by weight, preferably 0.5–1.5 parts by weight, per hundred parts of the aromatic polycarbonate.

It is also regarded to be among the features of this invention to include in the ternary polycarbonate composition conventional additives for purposes such as reinforcing, coloring or stabilizing the composition in conventional amounts.

The compositions of the invention are prepared by mechanically blending the high molecular weight aromatic polycarbonate with the organic, ester-type plasticizer and the acrylate copolymer by conventional methods.

EXAMPLES

The following examples set forth the best mode currently known to illustrate the invention and should not be construed as limiting the scope of the invention. In the examples, all parts and percentages are by weight unless otherwise specified.

EXAMPLE 1

Ninety-five and one-half (95.5) parts of an aromatic polycarbonate, derived from 2,2-bis(4-hydroxyphenyl) propane and having an intrinsic viscosity (I.V.) in the range of from about 0.46 to about 0.49 dl/g as determined in methylene chloride solution at 25° C., was mixed with four (4) parts of an acrylate copolymer of n-butyl acrylate and methyl methacrylate having a weight ratio of n-butyl-acrylate:methyl methacrylate of about 3:2, and one half (0.5) part of di-n-hexyl azelate as the organic, ester-type plasticizer. The ingredients were then blended together by mechanically mixing them in a laboratory tumbler and the resulting mixture was fed to an extruder which was operated at about 265° C. The resulting extrudate was comminuted into pellets and the pellets were injection molded at about 290° C.–310° C. into test specimens of about 5" by $\frac{1}{2}$" by $\frac{1}{4}$" and 5" by $\frac{1}{2}$" by $\frac{1}{8}$", the latter dimensions being the specimen thicknesses. Izod impact strengths of these specimens were measured according to the notched Izod test, ASTM D256, and are set forth in Table I. The ductile-brittle (D/B) transition temperatures, (the highest temperature at which a sample begins to exhibit a brittle mode of failure rather than a ductile mode of failure) were obtained according to the procedures of ASTM D256 and are also listed in Table I. The sample labeled CONTROL was obtained from a polycarbonate resin having an I.V. of about 0.46–0.49 dl/g and was prepared without either the acrylate copolymer or the organic ester-type plasticizer.

EXAMPLE 2

The procedure of Example 1 was repeated exactly, except that the weight parts of polycarbonate, acrylate copolymer and the di-n-hexyl azelate (DNHA) in the test specimen were, respectively, 95, 4 and 1. The test results obtained are listed in Table I.

EXAMPLE 3

The procedure of Example 1 was repeated exactly, except that the weight parts of polycarbonate, acrylate copolymer and DNHA in the test specimens were, respectively, 94.5, 4 and 1.5. The test results obtained are listed in Table I.

EXAMPLE 4

The procedure of Example 1 was repeated exactly, except that the weight parts of polycarbonate, acrylate copolymer and DNHA in the test specimens were, respectively, 96, 3 and 1. The test results obtained are listed in Table I.

TABLE I

| | Impact Strength, ft. lb./in. | | | | |
|---|---|---|---|---|---|
| | $\frac{1}{4}$"Thick | $\frac{1}{8}$"Thick | $\frac{1}{8}$", Heat Aged at 125° C. | | D/B, °C.** |
| Composition of: | Not Aged | Not Aged | 24 hrs. | 48 hrs. | $\frac{1}{8}$", Not Aged |
| Example 1 | 12.8[1] | * | 12.0[1] | 12.6[1] | −12/−18 |
| Example 2 | 11.6[1] | 15.3[1] | 11.9[1] | 11.0[1] | −12/−18 |
| Example 3 | 10.7[1] | 15.3[1] | 12.6[1] | 12.3[1] | −12/−18 |
| Example 4 | 3.7[2] | 15.3[1] | 2.6[2] | 2.5[2] | * |
| CONTROL | 1.6[2] | 14.8[1] | 1.3[2] | * | >−5 |

[1]Samples failed with 100% ductility.
[2]Samples failed with 0% ductility.
*Test not made.
**Change from ductile mode of failure to brittle mode of failure noted over indicated range.

I claim:

1. A ternary polycarbonate composition comprising in admixture, a high molecular weight aromatic polycarbonate, a minor amount of an acrylate copolymer which is a copolymer of a $C_1$–$C_5$ acrylate and a $C_1$–$C_5$ methacrylate, and a minor amount of an organic ester plasticizer.

2. The composition of claim 1 wherein said acrylate copolymer is present in an amount of about 2–4.2 parts by weight per hundred parts of aromatic polycarbonate.

3. The composition of claim 1 wherein said organic, ester plasticizer is present in an amount of about 0.4–2.0 parts by weight per hundred parts of aromatic polycarbonate.

4. The composition of claim 3 wherein said organic, ester plasticizer is present in an amount of about 0.5–1.5 parts by weight per hundred parts of aromatic polycarbonate.

5. The composition of claim 1 wherein the acrylate portion of said acrylate copolymer is selected from the group consisting of ethyl acrylate, n-butyl acrylate, 1,3-butylene diacrylate, isobutyl acrylate, 1,4-butanediol diacrylate and methyl acrylate and the methacrylate portion of said acrylate copolymer is selected from the group consisting of methyl methacrylate, 1,3 butylene dimethacrylate, isobutyl methacrylate, butyl methacrylate and ethyl methacrylate.

6. The composition of claim 5 wherein the aromatic polycarbonate is derived from 2,2-bis(4-hydroxyphenyl)propane.

7. The composition of claim 5 wherein the weight ratio of methacrylate:acrylate in said acrylate copolymer ranges from about 15–50: 50–85.

8. The composition of claim 1 wherein said organic, ester plasticizer is a member selected from the group consisting of azelate esters, adipate esters, and phthalate esters.

9. A ternary polycarbonate composition comprising an admixture of a high molecular weight aromatic polycarbonate; and acrylate copolymer in an amount of about 2–4.2 parts by weight per hundred parts of said aromatic polycarbonate, said acrylate copolymer being a copolymer of a $C_1$–$C_5$ acrylate and a $C_1$–$C_5$ methacrylate, said acrylate being a member selected from the group consisting of methyl acrylate, ethyl acrylate, n-butyl acrylate, 1,3-butylene diacrylate, isobutyl acrylate, and 1,4-butanediol diacrylate, and said methacrylate being a member selected from the group consisting of methyl methacrylate, ethyl methacrylate, butyl methacrylate, isobutyl methacrylate, and 1,3-butylene dimethacrylate; and, an organic, ester-type plasticizer in an amount of about 0.4–2.0 parts by weight per hundred parts of said aromatic polycarbonate and selected from the group consisting of azelate esters, adipate esters, and phthalate esters.

10. The composition of claim 9 wherein said aromatic polycarbonate is derived from 2,2-bis(4-hydroxy phenyl)propane.

11. The composition of claim 9 wherein said organic, ester plasticizer is present in an amount of about 0.5–1.5 parts by weight per hundred parts of said aromatic polycarbonate.

12. The composition of claim 9 wherein the weight ratio of methacrylate:acrylate in said acrylate copolymer ranges from about 15–50:50–85.

* * * * *